May 28, 1968 J. W. DODSWORTH 3,385,535

WEB TAKE-UP REEL CONTROLLER

Filed Aug. 26, 1966 2 Sheets-Sheet 1

INVENTOR
JAMES W. DODSWORTH
BY Elmer M. Edwards
AGENT

INVENTOR
JAMES W. DODSWORTH
BY Elmer W. Edwards
AGENT 3,385,535
Patented May 28, 1968

3,385,535

WEB TAKE-UP REEL CONTROLLER

James W. Dodsworth, Mount Tabor, N.J., assignor to Litton Business Systems, Inc., a corporation of New York Filed Aug. 26, 1966, Ser. No. 575,414
9 Claims. (Cl. 242—67.1)

ABSTRACT OF THE DISCLOSURE

A device for controlling a web take-up reel which is responsive to the tension of the web so that when this tension becomes too great the reel will be deactivated to prevent the web from being damaged. Operation is such that the reel continuously winds the web until the tension of the web deflects an arm to thereby disengage the drive and stop the rotation of the reel. When the tension in the web is lessened again, the reel will automatically begin to wind the web once more.

This invention relates generally to apparatus for controlling the tension on a web, such as a moving paper tape record, when being wound upon a take-up reel.

In web transport systems, such as magnetic and paper tape drives used in modern computers, a recurring problem concerns the maintenance of relatively constant tension on the tape to prevent breakage and undue wear. It is toward the solution of this problem that the present invention is related.

It is therefore a prime object of this invention to provide an improved web tension control.

It is a further object of this invention to provide an improved tape drive apparatus in which relatively constant tension is maintained on the tape.

Another object of the invention is to provide control means whereby the tape take-up reel is automatically stopped if for any reason an input feed of the tape thereto is halted.

An important feature of the invention resides in the use of a dancer arm adapted in response to changes in the tape tension to effect active engagements and subsequent release operations of a spring clutch drive means for the tape take-up reel, as driven by a continuously operating high impedance type motor. Thus the take-up reel is halted whenever the input tape drags sufficiently or is caused to be stopped for any reason and will thereafter be restarted automatically whenever sufficient slack occurs in the tape, as incident to a continuation of an input movement thereof to the take-up reel and without causing electrically induced noises within the computer as heretofore associated with the earlier known motor stop and start switch devices.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

Figure 1:
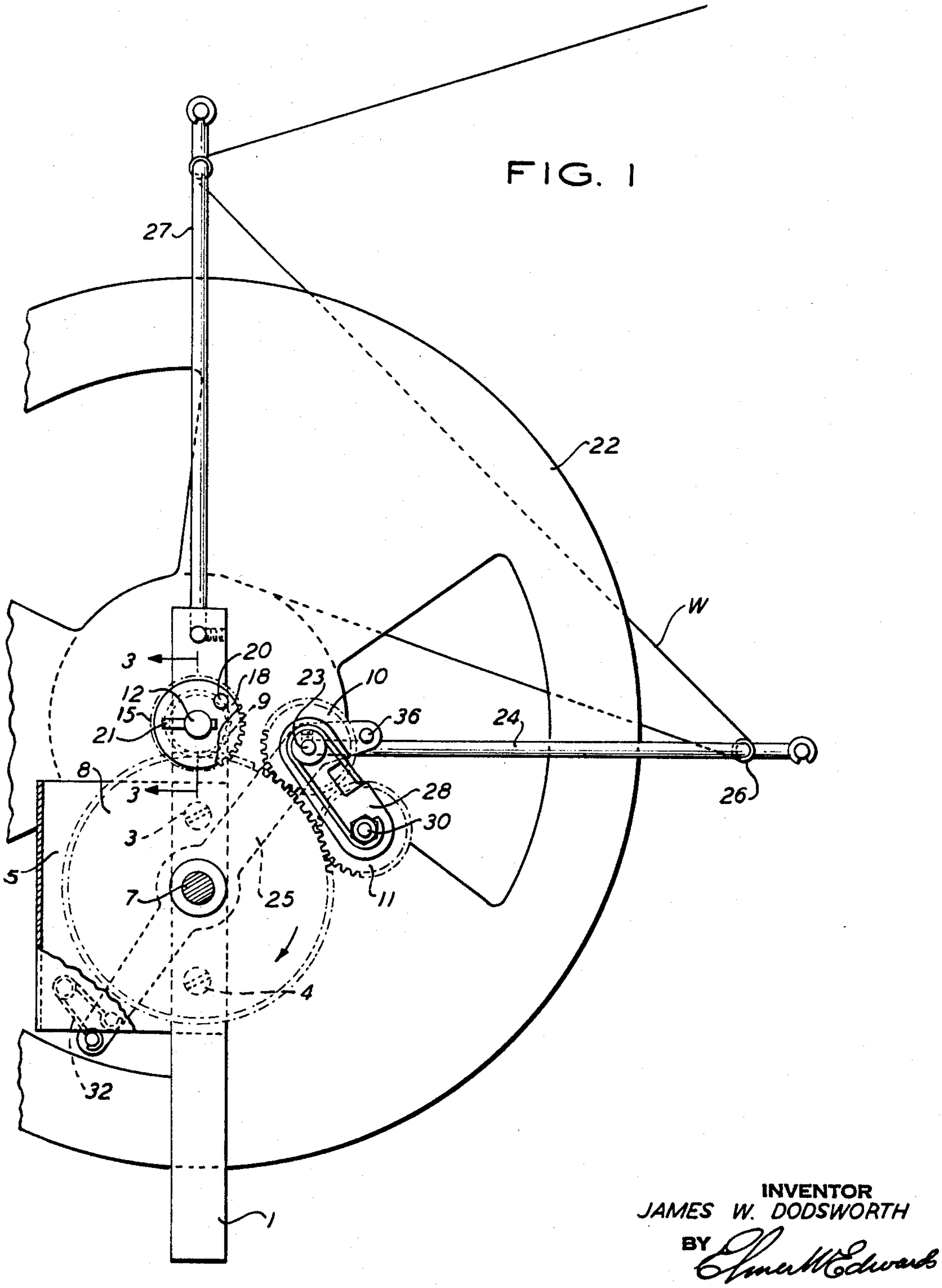
FIG. 1 is a side elevational of an apparatus constructed according to the invention.

According to this embodiment of the invention, the apparatus comprises a support member 1 of substantially square cross section and being bolted to a fixed support plate 2. Secured to support member 1 by means of bolts 3 and 4 is a U-shaped bracket 5 upon which is mounted an electric motor 6 of the high impedance type. On the shaft 7 of motor 6 is fast a drive gear 8 having in mesh therewith at different angular positions along its periphery a plurality of pinions indicated by the numerals 9, 10 and 11 respectively.

Figure 3:
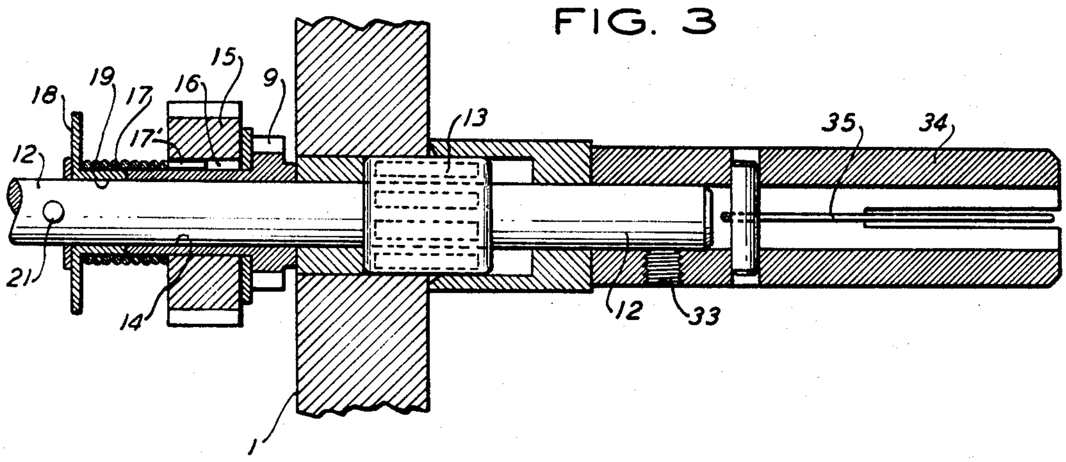
FIG. 3 is a section taken on line 3—3 of FIG. 1.
Figure 2:
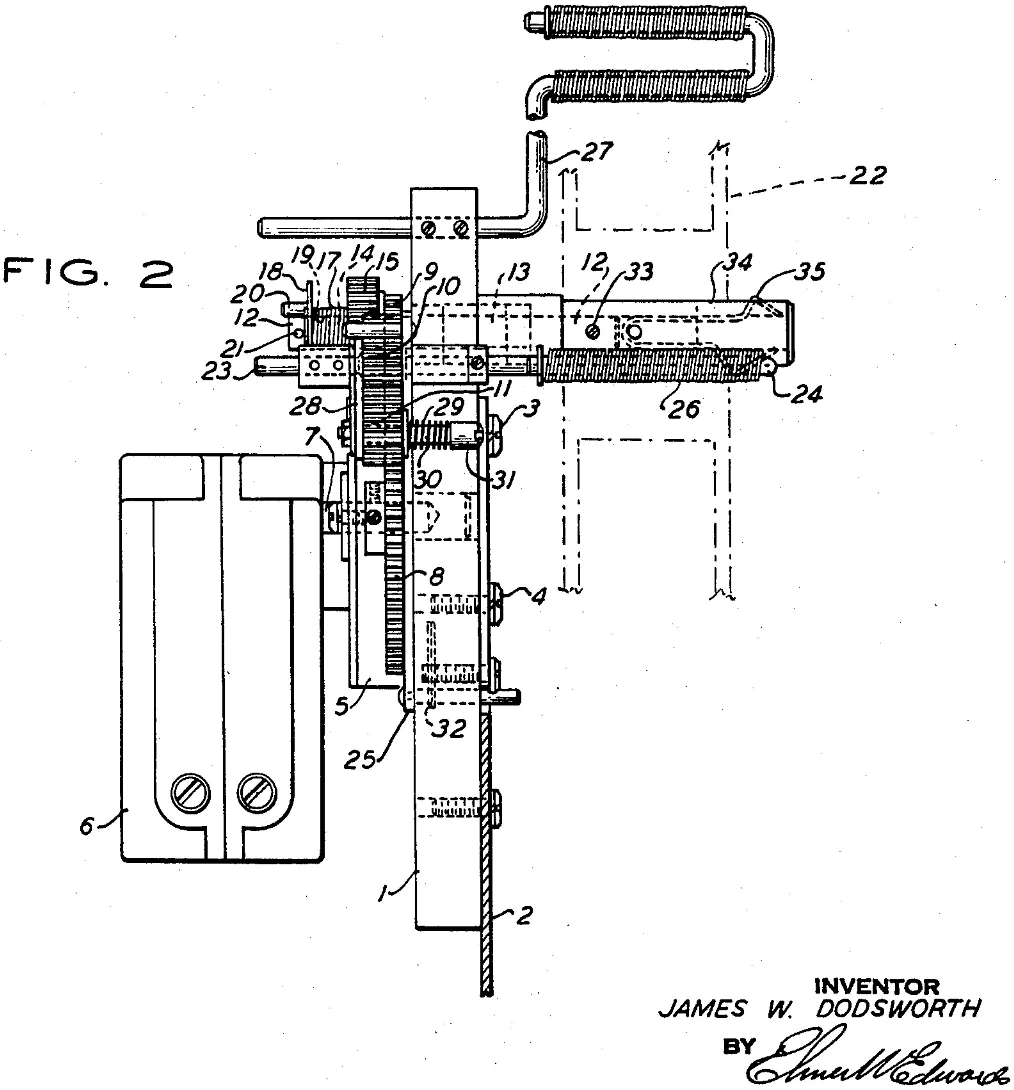
FIG. 2 is a front elevational thereof.

Pinion 9 is loosely mounted for rotation upon a shaft 12 in turn mounted for rotation in support member 1 through means of a well known one-way drive slip clutch bearing device 13, which permits of counter-clockwise rotation only (FIG. 2) of said shaft. Shaft 12 being the support shaft of the tape take-up reel 22 will thus prevent any reverse or unwinding operations of said reel in the operations of a dancer arm 24 controlled by the tape, as in manner hereinafter to be described. Pinion 9 has a leftward elongated hub 14 upon which is loosely mounted a gear 15 provided with a key slot 16 for receiving one terminal bent end 17′ of a coil spring 17 wound in a counter-clockwise direction upon said hub, as viewed from the right in FIG. 3.

Also loosely mounted for rotation upon shaft 12 is a disc 18 having a rightward hub 19, of similar diameter and abutting the hub 14, so that spring 17 is also coiled counter-clockwise upon said hub. Extending laterally from disc 18 is a drive pin 20 for engaging a pin 21 projecting outwardly from shaft 12 of the tape take-up reel 22.

Pinion 10 is in constant mesh with gear 8 and is mounted for rotation upon a lateral extension 23 forming the pivot end of a dancer arm 24. Extension 23 being pivotally supported upon a lever 25, in turn loosely mounted upon shaft 7. The distal end of dancer arm 24 is formed U-shaped and upon each leg of which is mounted a roller spring 26. An incoming tape or web W is passed between said roller springs and thereafter wound upon drum 22, operated by electric motor 6 in manner hereinafter to be described. During an input of tape W, the tape enters the machine by first passing through a similar U-shaped arrangement on the distal end of a fixed arm 27 extending upwardly from support member 1.

During a normal input feed of web W, as from any suitable companion equipment, dancer arm 24 is urged in a clockwise direction through means of pressure as exerted on gear 11 in meshing with the teeth of gear 8 operating in a clockwise rotation. Said gear 11 being rotatably supported by a link 28 fast upon extension 23 of the dancer 24. Suitable spring friction means 29 is provided on support stud 30 of gear 11 including an adjusting knob 31 for varying the frictional load whereby to regulate the desired force required in effecting a clockwise operation of the dancer arm 24 by said gears 8, 11. Also, a toggle means 32 is provided at the lower end of lever 25 for holding said lever, the gears 10, 11 and dancer 24 in the clockwise position shown or alternatively in a counter-clockwise set position. Said toggle means serving also to more rapidly move gear 10 into engagement with gear 15 in the operation of the parts, as hereinafter described.

Fast upon the right hand end of shaft 12 by means of set screws 33 is a spindle 34 upon which take-up reel 22 is mounted and held for rotation therewith by suitable spring clip means 35. Said spring clip being held within the counter bored end of said shaft and engaging a suitable key slot in the hub of reel 22. The enlarged opposite end of spindle 34 is counter bored for receiving the one-way drive slip clutch bearing 13, earlier described.

In the contemplated mode of operation the continuous motor drive, through gear train 8, 9 is intended to operate the tape take-up reel at speeds providing slightly greater tape take-up speed to that of the speed of the incoming tape web W toward the fixed support means 27. Thus in the operation of reel 22 any slack is taken out of the tape and thereafter the tape will cause dancer arm 24 and link 28 fast thereto to be rocked upwardly in counter-clockwise direction around point 23. During said operation, link 28 rocks gear 11 free of gear 8 and thereafter engages a pin 36 in the end of lever 25 and will rock said lever about point 7, beyond the center of toggle spring 32. Said toggle thereupon acts to move lever 25 more rapidly for engaging gear 10 thereon with the gear 15, earlier described. Upon said engagement of said gears, the gear 15 is rotated in a clockwise direction by gear 10, which thereby immediately releases the grip of clutch spring 17 with hubs 14, 19 and so stops operation of the shaft 12 and take-up reel 22. As the input movement of the tape continues, dancer 24 is now permitted to rotate clockwise about point 23, reengaging gear 11 with gear 8 and thereafter under influence of gear 8 acting on the teeth of friction gear 11, the arm 25 moves clockwise over toggle center while releasing gear 10 from gear 9 to again be held by toggle spring 32 in the position shown in FIG. 1.

To stabilize take-up operations of the web upon reel 22 against variations that might occur in the speed of an incoming web, a suitable lost motion pickup is provided between the drive pin 20 on disc 18 and the pin 21 in the spindle shaft 12. Thus as the teeth of drive gear 10 disengage from gear 15, which immediately releases clutch spring 17 to cause operation of disc 18, pin 20 on said disc is first carried substantially a complete revolution before operating the shaft 12. During such lost motion operation, lever 25 and the parts thereon are being displaced over toggle center, as in the manner above described.

Now having described the invention and the preferred embodiment thereof, it is to be understood that the invention is to be limited, not to the specific details herein set forth, but only by the scope of the claims which follow.

I claim:

1. Apparatus for controlling the tension on a web comprising:
   - a web holder;
   - a drive means including a clutch embodying a continuous unidirectional output drive for rotating said web holder in a given direction;
   - a control means for releasing said clutch to thereby release said output drive; and
   - a displacement arm mounted to receive a force relative to the web tension for thereby controlling said control means to determine operations of said clutch for enabling and disabling the output drive thereof in accordance with web tensions.

2. The invention according to claim 1; and said unidirectional output drive comprising a driven element and a laterally adjacent driving element, including a spring wound thereon to encompass both said elements for effecting a drive coupling therewith.

3. The invention according to claim 2; wherein said control means includes means which is adapted to automatically reengage said output drive after said drive has been released.

4. Apparatus for controlling the tension on a web comprising:
   - a web holder;
   - a drive train including,
     - a clutch embodying a unidirectional output drive for rotating said web holder in a given direction;
     - a driven element including a disc having a hub;
     - a laterally adjacent driving element comprising a pinion having a lateral hub;
     - a spring wound to encompass said driven element by being supported by said hub and to encompass said driving element by being supported by said lateral hub for effecting a drive coupling therebetween;
     - a support shaft;
     - a support for the web holder; and
     - a loss motion drive connection between said disc and said support shaft;
   - a control train for releasing said clutch to thereby release said output drive; and
   - a displacement arm mounted to receive a force relative to the web tension to thereby control said control train to determine operation of said clutch for enabling and disabling the output drive thereof in accordance with the web tension.

5. The invention according to claim 4; wherein said drive train includes
   - a power shaft having a gear rotatable therewith in drive connection with said pinion for effecting operation thereof;
   - and wherein said control train includes
     - a support member fulcrumed for rotation about said power shaft and having a pinion thereon driven by said gear;
     - a second pinion rotatable upon the hub of the first named pinion and having drive connection with a terminal arm of said coupling spring; and
     - means for displacing said support member for engaging the pinion thereon with the second pinion whereby to effect an unwinding movement to the coupling spring and thereby interrupt a driving operation of the web holder.

6. The invention according to claim 5; and
   - an arm pivoted upon said support member and having a pinion supported upon the distal end thereof which is engageable with said gear;
   - said arm operable in a first portion of movement of the displacement arm, incident to an increase of web tension, to displace said pinion on said arm out of engagement with said gear; and wherein a further movement of the displacement arm will rock said support member for engaging the pinion thereon with the second pinion for unwinding the coupling spring and so interrupt driving operation of the web holder.

7. The invention according to claim 6; and a toggle means associated with said support member, said toggle adapted for abetting the movement thereof to more rapidly effect the said engagement of said second pinion and said pinion on said support member.

8. The invention according to claim 6; and friction means adjustable for varying frictional loads on the said pinion mounted upon the distal end of said pivoted arm.

9. The invention according to claim 8; and
   - wherein a diminishing tension of the web will first release the displacement arm for reengaging the pinion associated with said friction means with the gear on said power shaft; and wherein
   - said gear on said power shaft acting on said friction controlled pinion will cause displacement of said support member to thereby disengage the pinion thereon from said second pinion and cause a restarting of the web holder.

References Cited

UNITED STATES PATENTS

| | | | |
|---|---|---|---|
| 2,361,192 | 10/1944 | Goodwin | 242—45 |
| 2,401,982 | 6/1946 | Springhorn. | |
| 2,700,513 | 1/1955 | Miles | 242—75.5 |
| 2,827,245 | 3/1958 | Kleinschmidt et al. | 242—55 |
| 2,845,232 | 7/1958 | Johnson et al. | 242—67.2 |
| 3,262,651 | 7/1966 | Henderson et al. | 242—75.5 |

WILLIAM S. BURDEN, *Primary Examiner.*